Feb. 1, 1944. J. NICOL 2,340,339
VEHICLE CONTROL MECHANISM
Filed Nov. 2, 1940 7 Sheets-Sheet 1

Inventor
John Nicol
By Strauch & Hoffman
Attorneys

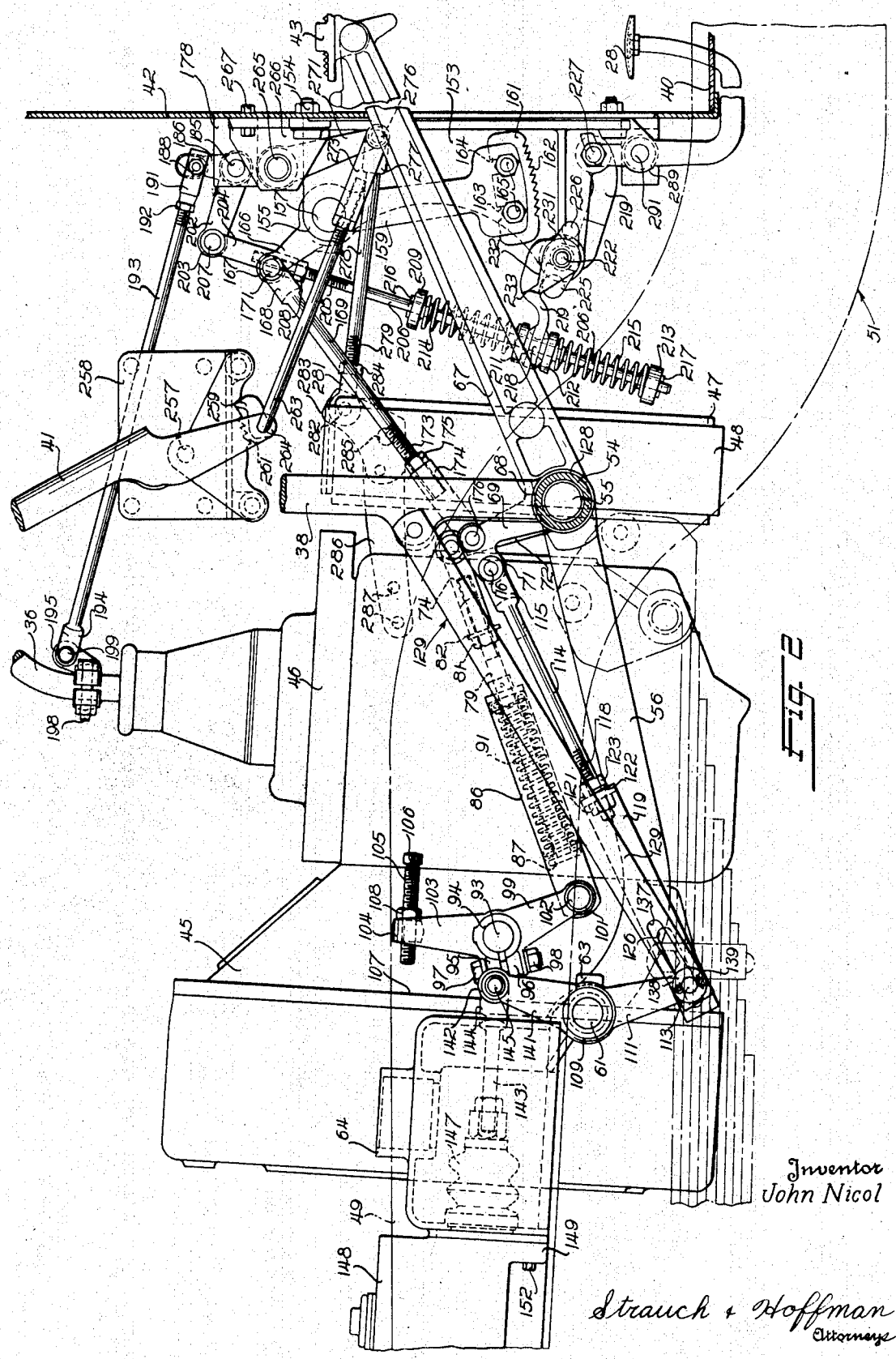

Feb. 1, 1944.  J. NICOL  2,340,339
VEHICLE CONTROL MECHANISM
Filed Nov. 2, 1940  7 Sheets-Sheet 3
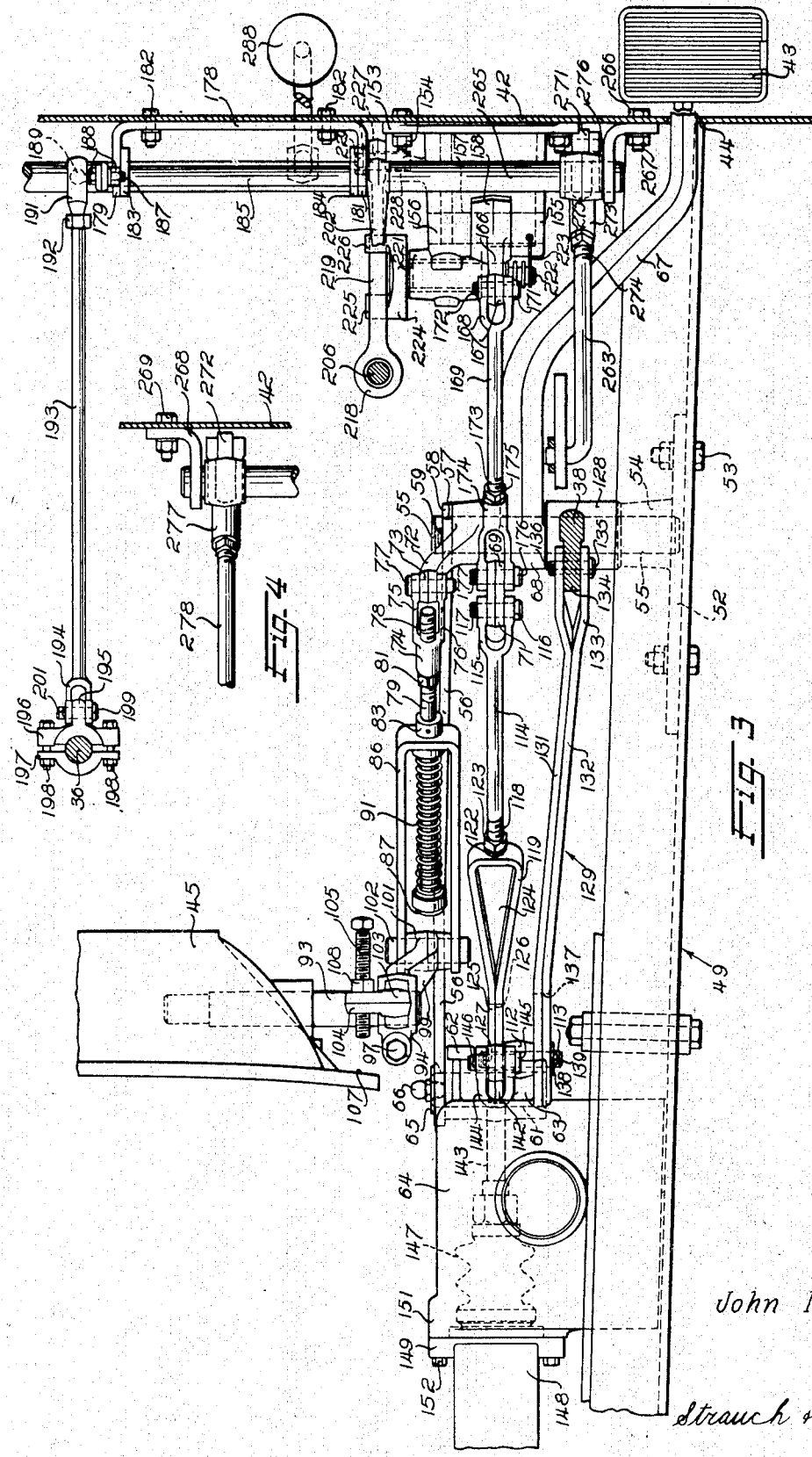
Inventor
John Nicol
Strauch & Hoffman
Attorneys Feb. 1, 1944.  J. NICOL  2,340,339
VEHICLE CONTROL MECHANISM
Filed Nov. 2, 1940  7 Sheets-Sheet 4
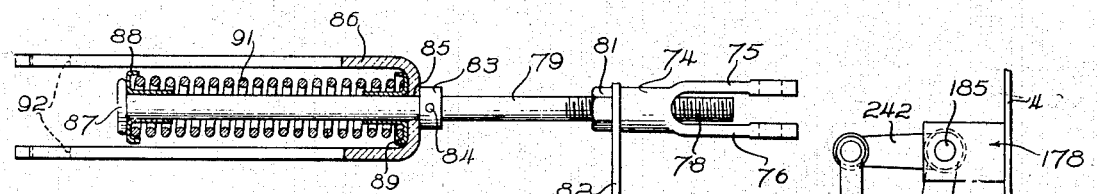
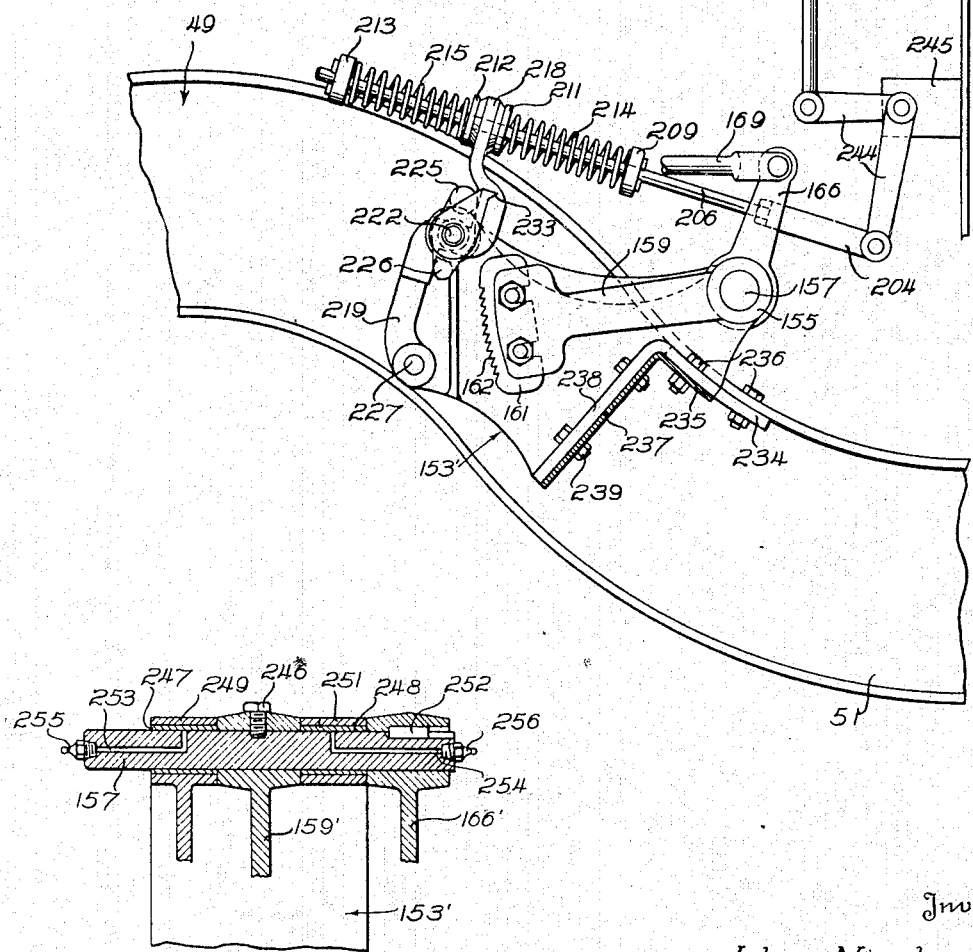
Inventor
John Nicol
By Strauch & Hoffman
Attorneys Feb. 1, 1944.  J. NICOL  2,340,339
VEHICLE CONTROL MECHANISM
Filed Nov. 2, 1940  7 Sheets-Sheet 5
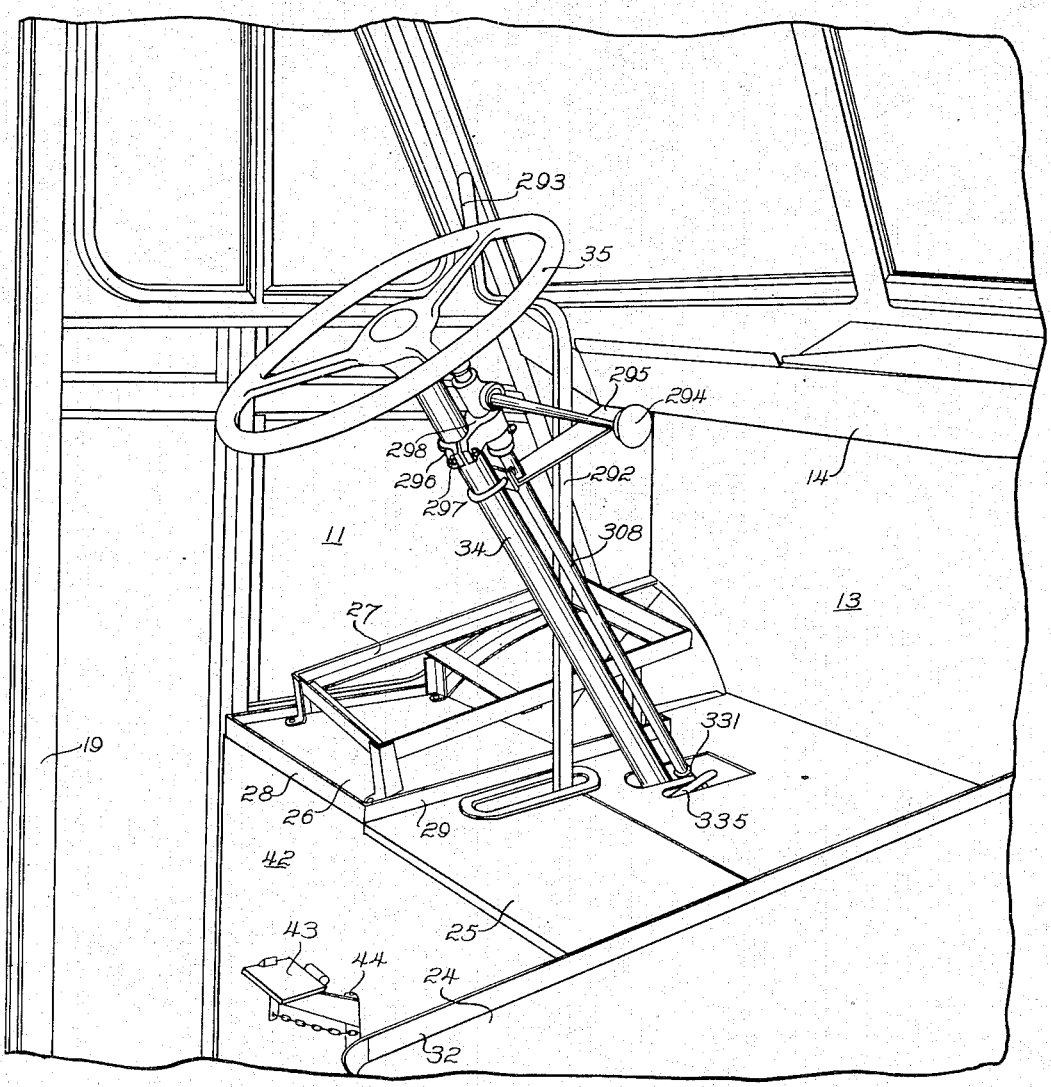
Fig. 8
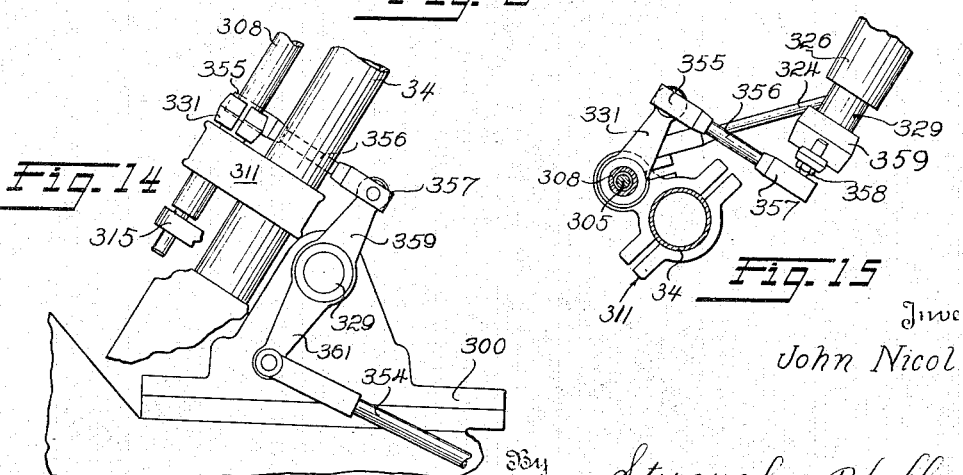
Fig. 14
Fig. 15
Inventor
John Nicol
By
Strauch & Hoffman
Attorneys

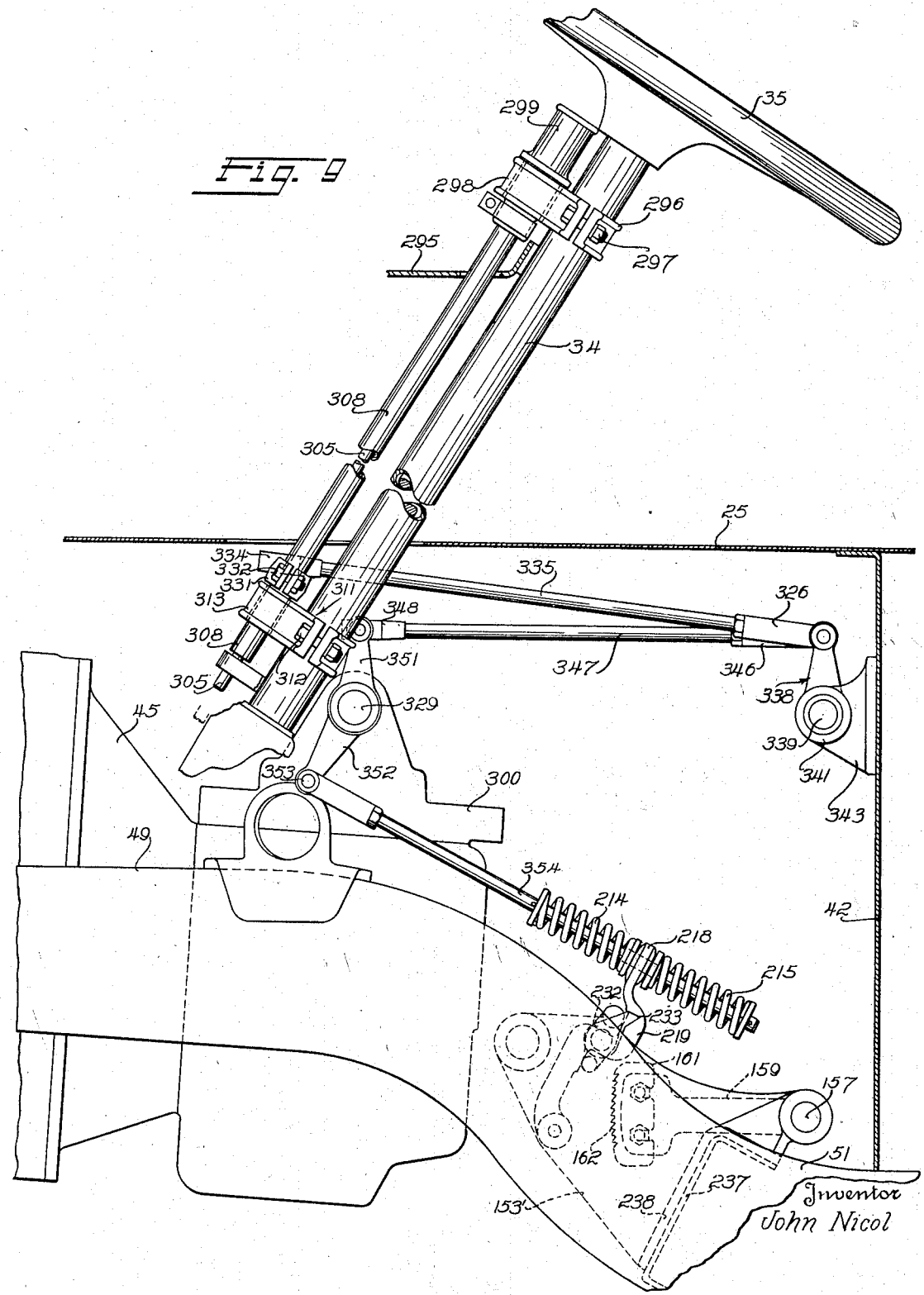

Feb. 1, 1944.         J. NICOL         2,340,339
VEHICLE CONTROL MECHANISM
Filed Nov. 2, 1940            7 Sheets-Sheet 7
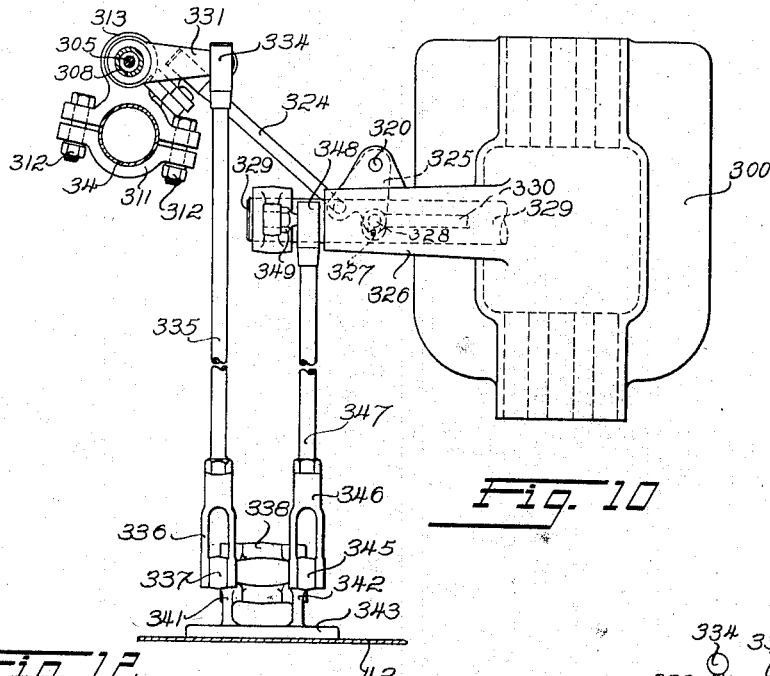
Fig. 10
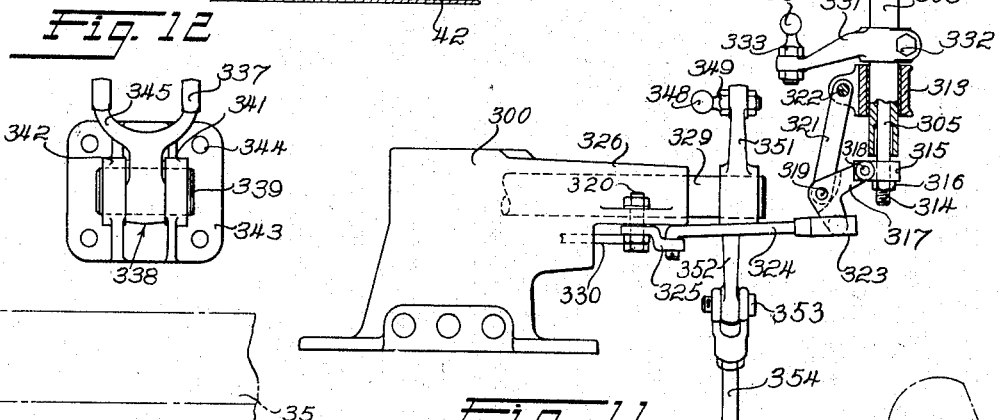
Fig. 12
Fig. 11
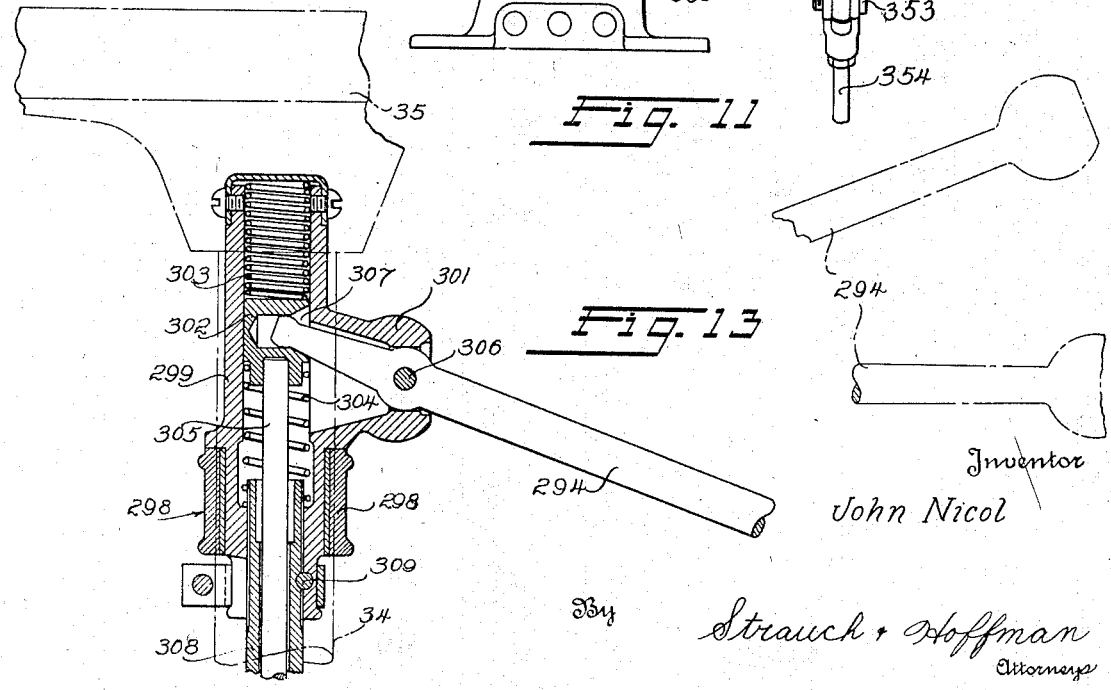
Fig. 13
Inventor
John Nicol
By Strauch + Hoffman
Attorneys Patented Feb. 1, 1944

2,340,339

UNITED STATES PATENT OFFICE 2,340,339

VEHICLE CONTROL MECHANISM

John Nicol, Detroit, Mich., assignor to Divco-Twin Truck Company, Detroit, Mich., a corporation of Michigan Application November 2, 1940, Serial No. 364,082

19 Claims. (Cl. 192—4)

My invention relates to vehicle control mechanism and is more particularly concerned with control mechanism for stand drive delivery vehicles and the like.

This application is a continuation-in-part of my co-pending application, Serial No. 202,536, filed April 16, 1938, now matured into United States Letters Patent No. 2,233,323.

While making house-to-house calls, the driver of a delivery vehicle usually drives only a short distance from one stop to the next where he alights, makes the delivery and then returns to start up the vehicle again. With the usual types of delivery vehicle, this involves much stooping, bending and other physical labor since the stops are usually very numerous and the driver soon becomes tired and less efficient. In this condition he often makes mistakes and may even be involved in traffic accidents.

In recognition of this problem, some vehicles for delivery and pick-up service have heretofore been designed to at least partially relieve the strain on the driver so that his efficiency might be improved. Some of these vehicles, many of which are now in use, are provided with low floor lines and rearranged controls so that the driver may enter the vehicle by a single step from the roadway level and drive the vehicle while standing upright therein on one foot and using the other foot to operate controls for the vehicle.

While these prior vehicles embodying the above mentioned features represent forward steps in development of such vehicles for efficient and economic delivery service, even the best of them still contain control arrangements which fall short of maximum convenience in operation.

In overcoming these and many other disadvantages of the prior art, it is a major object of my invention to provide novel vehicle control mechanism and arrangements designed to speed up operation of delivery and like vehicles. The invention is especially applicable to vehicles which can be driven from a standing position.

A further object of my invention is to provide a delivery vehicle in which ample cargo space is provided at the front of the body and the vehicle control mechanism is grouped in a novel arrangement to occupy a minimum of space while at the same time being conveniently accessible to the driver standing on a special platform built into the front end of the body.

A further object of my invention is to provide a delivery vehicle in which the controls are grouped adjacent the steering post in a novel manner for efficient manipulation by the driver whether he is standing or sitting. In connection with this object, the hand service brake lever is extended upwardly to pass adjacent the periphery of the steering wheel so that the driver can instantly grasp the brake lever with one hand while the other is kept on the steering wheel.

It is a further object of the invention to provide, in a vehicle, novel mechanism operatively interconnecting the gear shift lever and a ratchet or like locking device for the service brake controls, and novel support arrangements for such mechanism.

It is a further object of my invention to provide a novel clutch and brake control mechanism operated by a single control lever and wherein the clutch, after disengagement, is prevented from interfering with brake control operation of the lever.

A further object of my invention is to provide novel vehicle control mechanism wherein the master hydraulic brake cylinder is mounted upon one of the engine support brackets disposed between the engine and chassis.

A further object of my invention is to provide novel vehicle control mechanism, wherein the gear shift operating controls are supported on the steering post and are connected to actuate the service brake locking device.

A further object of the invention is to provide novel relay mechanism between the lower end of a steering post supported transmission control member and the transmission, whereby vibration of the transmission incident to operation of the motor will not be transmitted to the control member.

Further objects of my invention will presently appear as the description proceeds in connection with the appended claims and the annexed drawings in which:

Figure 2 is a side elevation, partly in section, illustrating a preferred embodiment of the clutch and brake control mechanism of the invention;

Figure 3 is a plan view of the control mechanism of Figure 2;

Figure 4 is a fragmentary view illustrating the support for the right hand end of an emergency brake operating shaft;

Figure 5 is an enlarged plan view, partly in section, illustrating the resilient clutch release rod;

Figure 6 is a side view of another embodiment of the clutch and brake control linkage, somewhat similar to Figure 2, but in which the transmission lever controlled ratchet is supported by a chassis cross member;

Figure 7 is a section illustrating another embodiment of the control lever arrangement at the ratchet shaft in Figure 6;

Figure 8 is an elevation illustrating a further embodiment of the invention wherein the vehicle is equipped with a transmission control assembly mounted on the steering post;

Figure 9 is an enlarged side elevation illustrating mainly the transmission and brake control mechanism of the vehicle of Figure 8;

Figure 10 is a top plan view of the transmission and brake control mechanism at the bottom of the steering post;

Figure 11 is a fragmentary front elevation of the mechanism actuated by the transmission control assembly;

Figure 12 is a front elevation of the support for the relay rods in the gear shifting linkage;

Figure 13 is an elevation, partly in section, of the upper end of the transmission control assembly;

Figure 14 is a fragmentary elevation of a further embodiment wherein the rockable shifter tube is connected substantially directly to the transmission control shaft; and Figure 15 is a plan view of the control linkage of Figure 14.

Figure 1:
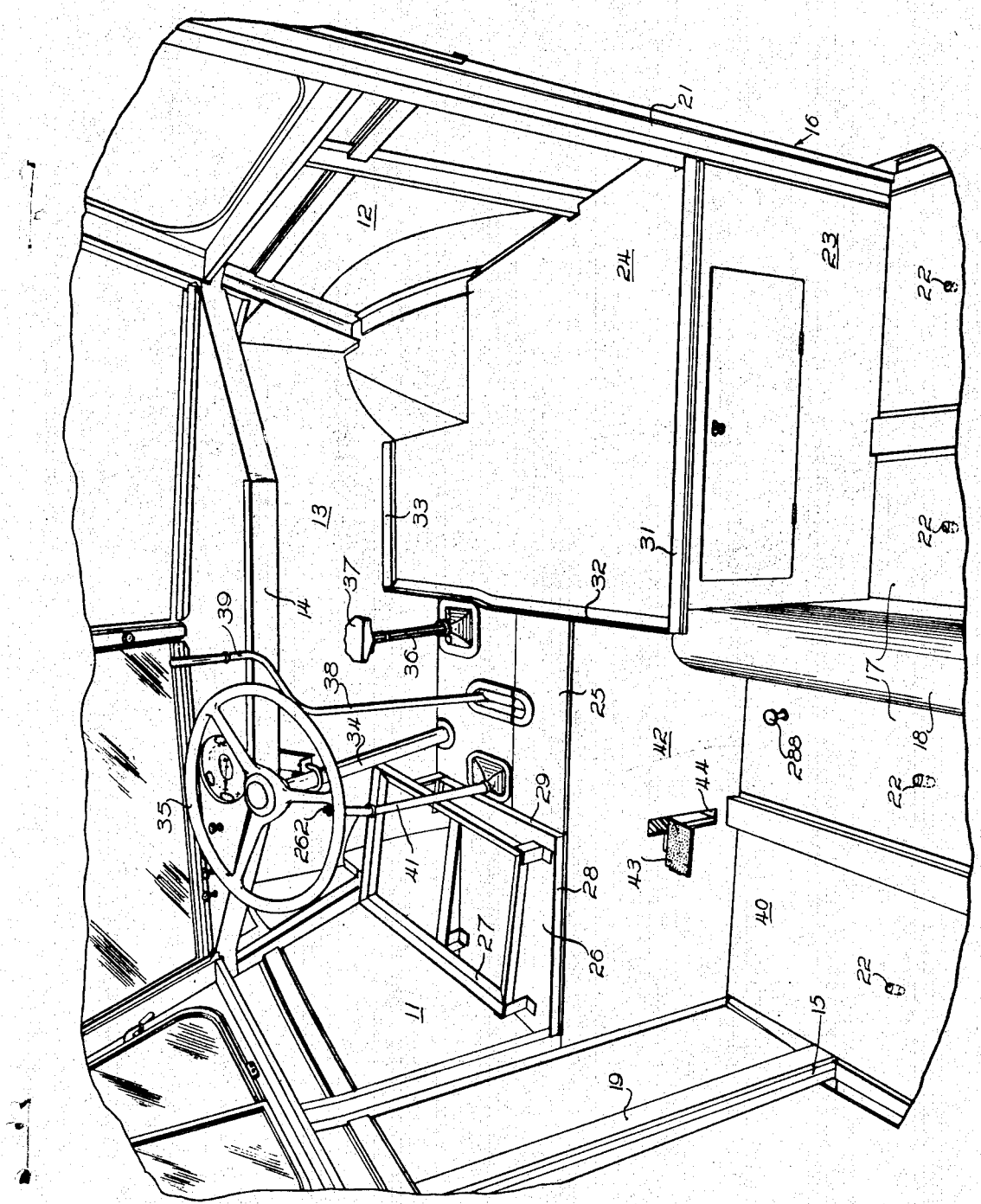
Figure 1 is an enlarged fragmentary view in elevation illustrating the control arrangements and the cargo platform at the front end of a stand drive vehicle body in a preferred embodiment of the invention.

Referring to Figure 1, opposite body side walls 11 and 12 are tied together at their front ends by a front body wall 13 and an instrument board assembly 14. Aligned doorways 15 and 16 are provided in the side walls at opposite ends of a through aisle 17 which extends completely across the body, being interrupted only by propeller shaft housing 18, and is disposed only a single short step above the level of the roadway on which the vehicle stands.

The forward doorway posts 19 and 21 are transversely aligned and define the front edge of the through aisle. The floor of aisle 17 is formed to receive suitable non-slip rubber and fabric mats, and is apertured as at 22 to permit drainage of waste liquid.

Supported upon the front of the body to the right of housing 18 is a storage compartment 23 for luggage, chains, tools and the like. The flat top wall 24 of compartment 23 extends forwardly to the front body wall 13. Wall 24 comprises part of a cargo platform which extends across the front of the body and also includes contiguous top walls 25 and 26 which lie in substantially the same plane as wall 24. Wall 25 is provided with a series of apertures through which the grouped vehicle control levers extend upwardly from the chassis. Wall 26 extends laterally from wall 25 to the left front side wall 11 and forwardly to front body wall 13.

An elevated skeleton rack 27 is rigidly secured to the top surface of wall 26. Rack 27 is designed to support a case of milk bottles and slopes downwardly and rearwardly to aid easy insertion and removal of the case. Milk cases, especially in the summer, are usually iced and the melted waste liquid from the ice often drains to the floor of delivery vehicles causing the floor to become dangerously slippery. In my vehicle, end and side edge ridges or dams 28 and 29, respectively, are provided for preventing liquid from draining from wall 26 to the vehicle floor. Similar suitable ridges or dams 31, 32 and 33 are provided at the inner edges of wall 24 for the same purpose. These dams also prevent waste liquid from draining into the apertures through which the control levers extend.

All of the hand operated vehicle controls extend from operating mechanism on the chassis upwardly through the grouped apertures in wall 25. These controls include a steering column 34 at the top of which is a steering wheel 35; a transmission lever 36 having a hand throttle control 37; a service hand brake lever 38 which is elongated and bent outwardly and upwardly at 39 to pass closely adjacent to the periphery of the steering wheel so that the brake may be applied upon only a slight shift of the hand from the steering wheel; and an emergency brake lever 41 which is located behind and slightly to the left of the steering column instead of being positioned to the right of transmission lever 36 as in the conventional automobile.

At the driver's side, the through aisle floor extends forwardly of door post 19 to an upright panel 42 which is disposed a substantial distance forwardly of the doorway. Thus a low floor compartment defined by panel 42 at the front, side wall 11 at the left and luggage compartment 23 and housing 18 at the right is provided forwardly of the through aisle. In this compartment, the floor of which is designated at 40, the driver may stand at the controls and be completely out of the way while a helper passes easily across the vehicle along the through aisle. A combination clutch and brake operating pedal 43 extends through an aperture 44 in panel 42 into the driver's compartment. With the driver's compartment so forwardly disposed with respect to the through aisle, there is no danger of tripping over this pedal while passing along the aisle.

From the above it will be seen that the driver may stand in his driver's compartment completely out of the through aisle when driving the vehicle from stop to stop. If there is a helper, he can pass entirely through the aisle and get off at either side of the vehicle without interfering with the driver. Furthermore, the driver has better road vision during driving periods since he is very close to the front end of the vehicle.

The grouped control arrangement above described results in increased efficiency of operation with all most frequently manipulated controls available to one hand of the driver while the other is maintained on the steering wheel. Location of the hand service brake adjacent the steering wheel periphery is especially advantageous in stand drive vehicles because no stooping or bending is required to locate and operate the service brake lever of my invention.

The body construction illustrated in Figure 1 is described and claimed in Serial No. 202,536 to which reference is hereby made for further details.

*Clutch and service brake operating mechanisms*

With reference to Figures 2 and 3, clutch 45 is disposed between the engine (not shown) and transmission assembly 46, and a suitable transmission shaft (not shown) delivers power from the transmission to the rear driving wheels. The transmission shaft is provided adjacent the transmission housing with a drum 47 encircled by a brake strap member 48. The clutch, transmission and brake may be of any desired construction as this invention is concerned mainly with the provision of improved controls for these elements.

Main longitudinal chassis member or channel 49 at the driver's side of the vehicle is formed with a dropped portion 51 below aisle 47. Member 49 is channel-shaped and provided with a support bracket 52 which is secured as by bolts 53 along the inner face of the vertical web of member 49. Most of bracket 52 is omitted in Figure 2 for the sake of clarity. Bracket 52 is provided with an integral hollow boss 54 which forms a socket for non-rotatably receiving one end of an inwardly extending pin 55. Pin 55 may be made integral with bracket 52 but preferably it is separate therefrom and made of hardened steel.

The outer surface of pin 55 is preferably machined since it is designed to serve as a pivot member upon which clutch and brake control levers are rotatably mounted as will later be described. A bracket 56 extends parallel to member 49 and is provided with an aperture through which extends the inner end of pin 55. Pin 55 (Figure 3) is grooved at 57 and bracket 56 is provided with a suitable locking tongue 58 fitting within the groove to secure pin 55 non-rotatably upon bracket 56. To further insure against bracket 56 moving axially beyond the inner end of pin 55 a suitable cotter key 59 is provided adjacent the end of pin 55.

Bracket 56 is bent downwardly to clear the clutch operating levers, later to be described, and is apertured to fit snugly over the inner end of a fixed bearing pin 61. Pin 61 is non-rotatably supported within a pair of downwardly extending apertured lugs 62 and 63 which are integral with or rigidly attached to the left rear motor support bracket 64. The forward end of bracket 56 is clamped against inner lug 62 by a suitable washer 65 and a threaded plug 66 which fits within a threaded bore at the inner end of pin 61.

Foot pedal 43 is mounted upon a rigid lever 67 which extends from the driver's compartment through panel 42 and is then bent laterally and forwardly to terminate in an elongated hollow boss 68. Boss 68 is machined to fit snugly but rotatably upon the inner portion of pin 55 so that combination clutch and brake control lever 67 is rotatably supported upon pin 55. Boss 68 is provided with a rigid arm 69 which extends upwardly substantially normal to lever 67 and terminates in a forwardly disposed lug 71. Preferably lever 67, boss 68, arm 69 and lug 71 are integral although if desired they may comprise separate elements rigidly secured together.

Inwardly of arm 69, boss 68 is provided with an integral arm 72 extending generally parallel to arm 69 but being bent slightly inwardly therefrom to terminate in a hollow boss 73. A yoke 74 is provided with an internally threaded body portion and a pair of apertured arms 75 and 76 which embrace opposite sides of boss 73 and are pivotally secured thereto by a suitable pivot pin assembly designated at 77.

Yoke 74 is adjustably mounted upon the threaded end 78 of a rod 79 and is held in adjusted position thereon by a suitable locknut 81 and clip 82. Rod 79 is provided with an enlarged collar 83 non-rotatably secured thereto as by a pin 84 and extends through an aperture 85 at the end of a substantially U-shaped strap 86 to terminate in an enlarged head portion 87 disposed between the legs of the strap.

A pair of oppositely disposed cupped spring retainer elements 88 and 89 are slidably mounted on rod 79 between head 87 and strap 86, and a coiled compression spring 91 surrounding rod 79 has its opposite ends fitted within the cupped retainers. Compression spring 91 tends to expand and force strap 86 against fixed collar 83. The legs of strap 86 extend beyond head 87 and are provided with aligned apertures 92.

The clutch release rod above defined is yieldable in the direction of its length for a purpose later to be described. The overall length of the clutch release rod can be varied by adjustment of yoke 74 along the threaded rod portion 78.

A conventional clutch operating shaft 93 extends laterally from clutch housing 45. A split collar 94 having matched lips 95 and 96 extending substantially radially therefrom is mounted upon shaft 93. Lips 95 and 96 are provided with aligned apertures through which pass a bolt 97 whose threaded end contains a suitable locknut 98. When nut 98 is tightened, collar 94 is secured tightly upon shaft 98. Collar 94 is provided with a downwardly extending arm 99 which terminates in an apertured cylindrical portion 101 embraced by the legs of strap 86. A suitable pivot pin assembly 102 maintains strap 86 and arm 99 pivotally connected to each other.

Collar 94 is also provided with an upwardly extending arm 103 which terminates in a lateral internally threaded boss 104 in which is rotatably disposed an elongated adjustment screw 105 having a head 106 designed to be fitted by a wrench or a similar tool. A portion of the clutch housing surface is preferably made flat to provide a positive surface stop 107 for engaging the tip end of screw 105 as will later be described. Collar 94 and arms 99 and 103 are preferably integral. The position of screw 105 with respect to stop 107 can be varied by rotation of screw 105 and lock nut 108 maintains this adjustment.

A collar 109 which fits snugly between lugs 62 and 63 is rotatably journalled on pin 61 and is provided with an integral downwardly extending arm 111. Arm 111 terminates in a boss 112 in which is non-rotatably secured a pivot pin 113 which extends laterally in opposite directions from boss 112. A lost motion connection is provided between pin 113 and lug 71 on control lever 67. This connection comprises a rod 114 provided at its rear end with a yoke 115 whose arms embrace opposite sides of lug 71. Lug 71 and the arms of yoke 115 are provided with aligned apertures for receiving a suitable pivot pin assembly comprising a headed pin 116 passing through the apertures and a cotter key 117.

The forward end of rod 114 is threaded at 118 and extends through an aperture in a strap 119 where it is provided with a nut 121 engaging the inner surface of strap 119. A lock washer 122 is maintained against the outer surface of strap 119 by a suitable nut 123. Obviously strap 119 can be adjusted along rod 114 and held in adjusted position by nuts 121 and 123.

The opposite ends of strap 119 are bent forwardly, preferably at an angle of more than 90°, and are further bent at their forward ends to extend parallel to each other with their inner surfaces contacting, thus providing a suitable space 124 in which the threaded end of rod 114 is disposed and a straight flat end portion 125. The doubled strap end portions are preferably secured together by welding to obtain an integral strap portion at 125. Strap portion 125 is slotted longitudinally adjacent its forward end at 126 to receive the inner projecting end of pin 113. A suitable cotter key 127 maintains strap portion 125 from sliding axially beyond the end of pin 113. In this manner strap 119 is slidably and pivotally connected with arm 111.

Service brake control lever 38 is provided at its lower end with a hollow cylindrical formation 128 by which it is rotatably mounted upon rigid pin 55 between boss 68 on the clutch and brake control lever 67 and the socket forming boss 54 secured to the chassis. A suitable spring (not shown) tends to pull lever 38 counterclockwise about its pivot. A lost motion connection is provided between lever 38 and pin 113. This connection comprises a strap 129 made up of two parallel strips 131 and 132 secured together as by welding along their entire lengths except at the rear where they flare outwardly to form a yoke 133 designed to embrace a projecting lug 134 on lever 38. A suitable pivot assembly comprising a headed pin 135 passing through aligned apertures in the yoke and lug and a cotter key 136 is provided between strap 129 and lever 38.

Adjacent its forward end strap 129 is slotted longitudinally at 137 to receive the outer projecting end of pin 113. Thrust washer 138 and cotter key 139 cooperate to prevent strap 129 from sliding axially beyond the outer end of pin 113. In this manner strap 129 is slidably and pivotally connected to arm 111.

Above arm 111, collar 109 is provided with an integral upwardly extending arm 141 which terminates in a hollow boss 142. A brake operating rod 143 is provided with a yoke 144 at its rear end embracing boss 142 and a suitable pivot pin assembly comprising a headed pin 145 passing through aligned apertures in boss 142 and yoke 144 and a cotter key 146 is provided between brake rod 143 and arm 141.

Rod 143 is connected at its forward end through a conventional hydraulic brake bellows 147 to a master hydraulic brake cylinder assembly 148 rigidly mounted upon motor support 64. Preferably brake cylinder 148 and motor support 64 are provided with mated flanges 149 and 151, respectively, secured together by a suitable fastening means such as bolts 152.

Ratchet mechanism for holding the service brake in applied position until released by manipulation of the gear shift lever will now be described.

A ratchet supporting bracket 153 is secured in a suitable manner, as by bolts 154, upon the front surface of panel 42. Bracket 153 is provided with spaced forwardly projecting bosses 155 and 156 which have aligned apertures in which are journalled opposite ends of a ratchet pivot pin 157. Between bosses 155 and 156, a collar 158 having an integral downwardly extending arm 159 is non-rotatably secured upon pin 157. A segmental ratchet member 161 having a plurality of teeth 162 is provided with rear edge slots 163 and 164 fitting over the shanks of suitable bolts 165 passing between the arms of the bifurcated lower end of arm 159. When bolts 165 are tightened, ratchet member 161 is secured upon arm 159 and the provision of slots 163 and 164 permits the easy removal and replacement of ratchet member 161 when it is worn or broken.

Collar 158 is also provided with an upwardly extending integral arm 166 terminating in a boss 167 which is embraced by the arms of a yoke 168 at the rear end of a forwardly extending rod 169. A suitable pivot assembly comprising a headed pivot pin 171 passing through aligned apertures in yoke 168 and boss 167 and a cooperating cotter key 172 is provided between rod 169 and arm 166.

The forward end of rod 169 is threaded at 173, and a yoke 174 having a threaded body portion is maintained in adjusted position on rod 169 by a suitable nut 175. The arms of yoke 174 embrace the upper end of arm 69, and a suitable pivot assembly comprising a headed pivot pin 176 extending through aligned apertures in the arm 69 and yoke 174 and a cotter key 177 provide a pivotal connection between rod 169 and arm 69. The purpose of this connection will be described later.

Above bracket 153, a substantially U-shaped bracket 178 having forwardly extending legs 179 and 181 is secured upon the front surface of panel 42 by suitable means such as bolts 182. Reinforcing plates 183 and 184 are secured on the inner surfaces of legs 179 and 181, respectively. A laterally extending rock shaft 185 passes through aligned apertures in legs 179 and 181 and plates 183 and 184, and in this manner is rotatably supported upon bracket 178. The inner end of shaft 185 extends beyond leg 179 and is non-rotatably secured to the lower end of an upwardly extending rigid link 186. The upper end of link 186 is provided with a threaded stud 187 secured to link 186 by nuts 188 and provided at its free end with a ball 189 cooperating with a suitable spring socket 191 which is maintained by a suitable nut 192 upon one end of a forwardly extending operating rod 193. A yoke 194 is provided at the forward end of rod 193 for embracing a lug 195 which is preferably integral with one of the mated clamp members 196 and 197 secured by bolts 198 upon the lower end of transmission lever 36 just above its place of entrance into the transmission assembly. A suitable pivot assembly comprising a headed pivot pin 199 extending through aligned apertures in yoke 194 and lug 195 and a cooperating cotter key 201 provide a pivotal connection between lever 36 and rod 193.

A short forwardly extending rigid link 202 is non-rotatably secured to the outer end of shaft 185 beyond leg 181 and terminates in a flat-sided boss 203. A yoke 204 has a hollow threaded body portion mounted upon the threaded end 205 of a downwardly extending rod 206 and a pair of arms embracing boss 203. A suitable pivot assembly including a pivot pin 207 passing through aligned apertures in boss 203 and yoke 204 provides a pivotal connection between link 202 and loke 204. A suitable nut 208 holds yoke 204 in a predetermined adjusted position on rod 206.

The lower end of rod 206 has slidably supported thereupon two pairs of oppositely facing cupped spring retainer elements designated at 209, 211, 212 and 213. A coiled compression spring 214 surrounds rod 206 and has its opposite ends disposed in upper opposed retainers 209 and 211. A similar coiled spring 215 also surrounds rod 206 and has its opposite ends disposed in lower opposed retainers 212 and 213. Rigid pins 216 and 217 extend through rod 206 adjacent retainers 209 and 213 and prevent springs 214 and 215 from moving retainers 209 and 213, respectively, toward opposite ends of rod 206.

Retainers 211 and 212 are urged against opposite sides of a lug 218 which surrounds shaft 206 and is preferably integral with the forward end of a ratchet dog operating lever 219 later to be described. The coil spring and retainer assembly above described is preferably provided with a cover of leather or the like to keep out dust and dirt and retain lubrication.

Ratchet support bracket 153 is provided with a downwardly extending hollow cylindrical portion 221 in which is journalled a rock shaft 222. Shaft 222 extends laterally in both directions beyond the edges of portion 221. A coil spring 223 surrounds shaft 222 and has its opposite ends secured to shaft 222 and bracket 153, respectively. Spring 223 tends to rotate shaft 222 in a clockwise direction (Figure 2). The other end of shaft 222 is provided with a flange 224 having spaced aligned laterally projecting pins 225 and 226 thus providing a bifurcated member embracing an intermediate portion of lever 219. Preferably pins 225 and 226 are integral with flange 224 which in turn is non-rotatably secured in some suitable manner upon the end of shaft 222.

Lever 219 is journalled at its rear end upon a pivot pin 227 which is non-rotatably secured in a socket forming boss 228 extending laterally from the lower end of bracket 153. A suitable nut and washer assembly 229 maintains lever 219 against axial movement on pin 227. Lever 219 extends forwardly from pin 227 to pass beneath pin 226, then turns upwardly at 231 substantially at right angles to pass between pins 225 and 226 and then turns forwardly again substantially at right angles to pass over the top of pin 225 and terminate in lug 218 about rod 206. A dog 232 having projecting tooth 233 is non-rotatably mounted upon shaft 222 adjacent the outer edge of cylindrical portion 221 and below the ratchet member. Rotation of shaft 222 rotates dog 232 into and out of engagement with teeth 162 on rack 161 during certain operating conditions later described.

In operation, the driver in the driver's compartment may operate both clutch and hydraulic service brake sequentially by stepping on pedal 43 to rotate lever 67 clockwise (Figure 2) about its pivot upon pin 55. Rotation of lever 67 acts through arm 72, yoke 74, rod 79, strap 86 and arm 99 to rotate clutch shaft 93 in a direction tending to disengage the engaged clutch members inside clutch housing 45. The elements above mentioned are so designed that only a small angle of rotation of lever 67 about its pivot will cause complete disengagement of the clutch. Screw 105 is so positioned that its tip end engages the housing surface at 107 at the moment the clutch members have been completely disengaged. Further movement of lever 67 after screw 105 has engaged stop 107 merely causes rod 79 to be pulled along strap 86 against the resistance of spring 91. In this manner, continued rotation of lever 67 after the clutch has been disengaged will be entirely free of interference from the clutch springs inside clutch housing 45, and will be resisted only by the force required to compress spring 91 as the clutch release rod is elongated. Through screw 105 and nut 108, this control can be adjusted and fixed to suit the throwout position of any conventional clutch and the invention can be quickly mounted in any existing installation.

During the period that the clutch operating elements above described are disengaging the clutch, the pedal controlled service brake elements comprising rod 114 and strap 119 are pulled rearwardly due to the positive pivotal connection between arm 69, integral with lever 67, and rod 114. However, slot 126 at the lower end of strap 119 is so designed and placed with respect to pin 113 that strap 119 must travel a substantial distance before the forward end of slot 126 engages pin 113 to cause rotation of brake operating arm 111. By manipulation of the adjustment nuts at 121 and 123, strap 119 can be adjusted along rod 114 and the position of the forward end of slot 126 can be accurately set with respect to pin 113 so that engagement of strap 119 and pin 113 takes place just after the clutch members have been disengaged and the tip of screw 105 contacts stop 107.

Continued rotation of lever 67 about its pivot, after pin 113 has been engaged by the forward end of slot 126, causes brake operating arms 111 and 141 to rotate counterclockwise about pin 61 and consequent advance of brake operating rod 143 to apply the hydraulic service brakes. When pressure of the operator's foot is released at pedal 43, heavy return springs (not shown) tend to rotate lever 67 in a counterclockwise direction and return the parts to the position shown in Figure 2.

The service brakes may also be controlled by manipulation of lever 38. The operator in the driver's compartment grasps the upper portion 39 of lever 38 and pulls rearwardly to rotate lever 38 in a clockwise direction about its pivot 55. In Figure 2, lever 38 is shown in its foremost forward brake-released position and strap 129, connecting lever 38 and brake operating arm 111, is disposed with the forward end of slot 137 in engagement with pin 113 on arm 111. With the parts in this position it is obvious that clockwise rotation of lever 38 will cause immediate application of the service brakes. A suitable heavy return spring extending between lever 38 and the chassis (not shown) tends to maintain lever 38 in the full line position of Figure 2.

Slot 137 is designed to prevent the hand service brake control comprising lever 38 and strap 129 from interfering with the pedal actuated service brake control. Starting with the parts in the position shown in Figure 2, brake applying motion of lever 67 causes arm 111 to rotate to apply the service brakes but that portion of the pin 113 which is disposed in slot 137 merely travels rearwardly in the slot and lever 38 remains stationary.

Similarly slot 126 in strap 119 is designed to prevent the foot pedal linkage from interfering with brake applying motion of lever 38. Starting with the parts as shown in Figure 2, clockwise rotation of lever 38 rotates arm 111 to apply the service brakes but that portion of pin 113 which is disposed in slot 126 merely travels rearwardly in the slot, causing rod 114 to be rotated idly about its pivot at 116, but otherwise the foot pedal linkage remains stationary. Brake release movements of levers 67 and 38 involve only a reversal of the operations above described.

The ratchet mechanism mounted on panel 42 is designed to cause the foot pedal actuated service brake mechanism to be locked in brake applied positions and manipulation of a vehicle control, other than a service brake control, is required to unlock the brake mechanism to release the brakes.

With the parts as shown in Figure 2, foot pedal lever 67 is in brake release position and the gear shift lever 36 of the conventional selective transmission is in neutral position. When lever 67 is rotated to apply the service brakes, the ratchet operating linkage comprising yoke 174, rod 169 and arm 166 causes clockwise rotation of ratchet arm 159. As arm 159 moves forwardly, ratchet member 161 engages dog tooth 233 and causes counterclockwise rotation of the resiliently mounted dog 232 against the force of spring 223. Further brake applying movement of lever 67 causes ratchet teeth 162 to slide over tooth 233 but when the operator releases pressure on pedal 43 to permit return movement of the brake operating linkage, dog tooth 233 is forced upwardly through the action of spring 223 into engagement with the teeth of segmental ratchet member 161 to prevent such return movement, thereby locking the service brake in applied position. The resilient connection between rod 206 and lug 218 provides an effective lost motion connection which compensates for wear and allows application of this linkage to any conventional transmission.

Dog tooth 233 cannot be released by manipulation of any of the service brake controls and is released only when the gear shift lever 36 has been moved out of neutral position into a position where the transmission gears transmit drive to the driving wheels. When lever 36 is pulled rearwardly, as to select either first or high speed of the standard gear shift arrangement, rearward movement of rod 193 causes clockwise rotation of rock shaft 185 which in turn causes rod 206 to be pulled upwardly through arm 202.

Upward movement of rod 206 compresses spring 215 and tends to rock lever 219 in a clockwise direction about its pivot at 227. During such rocking, lever 219 engages the under side of pin 226, thereby tending to rock shaft 222 and dog 232 counterclockwise to disengage tooth 233 from ratchet teeth 162.

However, engagement of dog tooth 233 with the undercut ratchet teeth is such that they cannot be separated without first slightly shifting teeth 162 to the left in Figure 2. This is accomplished by simultaneously stepping on pedal 43 to rock ratchet arm 159 clockwise slightly thereby enabling the force stored in compressed spring 215 to rock dog 232 to separate tooth 233 from the undercut ratchet teeth. In this movement, rotation of shaft 222 is opposed by spring 223 which is designed to return the shaft to the position shown in Figures 2 and 3 when the gear shift lever is in neutral. After release from dog 232, ratchet arm 159 is free to swing rearwardly and no longer interferes with the return movement of lever 67 whereby the service brakes are released from foot pedal control.

With reference to Figure 2, when lever 36 is pushed forwardly, as to select standard reverse or second speed positions, rod 193 will be pulled forwardly to rock shaft 185 counterclockwise and thereby cause downward movement of rod 206. This causes spring 214 to be compressed and tends to rock lever 219 counterclockwise about its pivot at 227. During such rocking, the under side of lever 219 engages the top side of pin 225 whereby tending to rock dog 232 counterclockwise to tend to release dog tooth 233 from ratchet teeth 162 as described above. When pedal 43 is depressed, such permits the force stored in spring 214 to separate the ratchet and dog. Thus, movement of gear shift lever 38 out of neutral to select any driving speed accompanied by pressure on pedal 43 will release the service brake locking mechanism.

It is often customary during operation of a vehicle to decelerate merely by stepping temporarily on the brake pedal without placing the gear shift lever in neutral. Since tooth 233 is held out of the path of ratchet teeth 162 when the gear shift lever is not in neutral, there is no danger that the brake mechanism will become locked under such driving conditions.

In the embodiment of the invention illustrated in Figure 6, the service brake ratchet locking mechanism is mounted on a lateral chassis member rather than on body panel 42 as in Figure 2.

Oppositely disposed support plates 234 are secured to the under sides of the top legs of the main longitudinal chassis members. A lateral chassis member 235 extends between plates 234; and the chassis members, support plates 234 and member 235 are rigidly secured to each other, preferably by a plurality of bolts 236 or by welding.

Adjacent chassis member 49, lateral member 235 is provided with a downwardly extending leg 237 disposed substantially at right angles thereto. The upper surfaces of member 235 and leg 237 cooperate to form a seat for receiving the recessed flanged portion 238 of ratchet bracket 153'. Suitable fastening means such as bolts 239 maintain bracket 153' upon member 235. Other than its recessed flanged portion 238, bracket 153' is preferably identical with bracket 153 of Figure 2 and rotatably supports a pivot pin 157 upon which is secured an integral ratchet arm assembly comprising collar 155 and arms 166 and 159. Arm 166 is pivotally connected to brake operated arm 169 as in Figure 2.

The mechanism for releasing dog tooth 233 from ratchet teeth 162 is somewhat different from that shown in Figure 2 and comprises an operating rod 239 (similar to rod 193 of Figure 2) pivotally connected to one end of an arm 241 which is non-rotatably secured upon one end of rock shaft 185. A forwardly extending arm 242 is secured non-rotatably upon the other end of shaft 185 and is pivotally connected to one end of a downwardly extending link 243. At its lower end, link 243 is pivotally connected to one end of a bell crank 244 journalled upon bracket 245 secured to panel 42. The other end of bell crank 244 is pivotally connected to yoke 204 on the ratchet dog operating rod 206.

Manipulation of the gear shift lever acts through rod 239, arm 241, rock shaft 185, arm 242, link 243 and bell crank 244 to shift rod 206 axially and operate the ratchet dog release lever 219 in the same manner as described above with respect to Figure 2.

The above described arrangement facilitates line assembly since the ratchet bracket is secured directly to the chassis which also provides a more substantial support than the body panel 42, resulting in improved operation of the whole ratchet assembly.

In Figure 7, a modified arrangement of the ratchet assembly is illustrated wherein the integral ratchet bearing member of Figure 6 is made up of two separate arms each non-rotatably secured to shaft 157. Ratchet bearing arm 159', corresponding to arm 159 in Figure 6, is non-rotatably secured as by a set screw 246 upon shaft 157 which is journaled in bearing liners 247 and 248 in bosses 249 and 251 of bracket 153'. Arm 166', corresponding to arm 166 of Figure 6, is non-rotatably secured to shaft 157 as by a suitable key and slot assembly designated at 252.

Lubrication for shaft 157 is provided by the use of suitable lubricant channels 253 and 254 which extend from lubricant fittings 255 and 256, respectively, to the bearing surfaces at 247 and 248, respectively.

Hand emergency brake

The hand emergency brake lever 41 extends through wall 25 to the rear and slightly to the left of the steering column as shown in Figure 1, and is pivotally supported upon a suitable pivot pin assembly 257 mounted on a suitable supporting bracket 258 as shown in Figure 2. Bracket 258 is preferably secured to an upright member (not shown) rigidly fastened to a main chassis member or may be rigidly supported in any desired manner upon the chassis.

A pivoted pawl 259, adapted to engage with ratchet teeth 261 to hold the emergency brake in applied position, is mounted upon the lower end of lever 41 and is controlled by the conventional push button 262 at the top of lever 41. A brake operating rod 263 is pivotally secured at 264 to the lower end of lever 41.

With reference to Figure 3, a rock shaft 265 is journalled at one end in a bracket 266 secured to the front side of panel 42 above ratchet supporting bracket 153 by bolts 267. The opposite end of shaft 265 (Figure 4) is journalled in a similar bracket 268 secured to panel 42 by bolts 269 or the like. A pair of downwardly extending preferably identical and parallel arms 271 and 272 are secured non-rotatably upon shaft 265 adjacent the inner sides of brackets 266 and 268, respectively.

The lower end of arm 271 is embraced by a yoke member 273 which is threadedly mounted upon the threaded end 274 of brake operating rod 263 and maintained against movement thereupon by locknut 275. A suitable pivot assembly including a pivot pin 276 passing through aligned apertures in yoke 273 and arm 271 provides a pivotal connection between rod 263 and arm 271.

The lower end of arm 272 is embraced by the arms of a yoke member 277 which is preferably integral with one end of a rod 278 whose forward end is threaded at 279. A connecting member having an internally threaded body 281 fitting over the threaded portion 279 of rod 278 is apertured at its forward end to fit over a suitable pivot pin 282 secured to a cam member 283. A suitable fastening means such as lock nut 284 maintains member 281 in adjusted position. Cam 283 is pivotally mounted upon a pin 285 secured to the free end of a rigid bracket 286 which is preferably fastened to the transmission housing 46 by a suitable means such as bolts 287. The cam surface of cam 283 rests upon a suitable lip formed upon the free end of the transmission brake strap 48 for a purpose to be later described.

In operation, when the top of lever 41 is pulled rearwardly by the driver, lever 41 rotates clockwise about pivot 257 thereby pulling rod 263 and arm 271 forwardly to cause clockwise rotation of shaft 265. Such rotation of shaft 265 acts through arm 272 and rod 278 to rotate cam 283 counterclockwise about its pivot whereby the cam displaces the free end of brake strap 48 to cause the brake strap to frictionally grip the peripheral surface of drum 47. Since my invention is concerned with the control rather than with the specific construction of the transmission brake, no further description of the brake elements is believed necessary.

From the above it will be seen a simple positive operating linkage has been provided to adapt the hand emergency control brake lever for operation of the transmission brake from its new position to the left of the steering column. This operating linkage is applied to conventional brake structure so that no changes in the brake elements are necessary.

Accelerator pedal 288 is disposed on the floor of the driver's compartment and extends downwardly and upwardly to a support bracket 289 having a pivot pin 291 upon which pedal 288 is pivotally mounted. No further description of the accelerator mechanism will be given because such does not constitute part of the present invention.

*Transmission control handle on steering post*

Referring to Figure 8, elongated hand service brake lever 292 extends upwardly through floor 25 to the left of steering post 34 and is provided with a laterally and upwardly bent portion terminating in a handle 293 which extends past and closely adjacent the periphery of wheel 35 at the left side.

Lever 292 is associated with the steering wheel in exactly the same manner as lever 38 of Figure 1, except that lever 292 is operated by the operator's left hand. The lower end of lever 292 is connected to actuate the service brake mechanism in the same manner as lever 38 above described.

The chief reason for locating lever 292 at the left of the steering wheel in this embodiment of the invention is to separate this control from possible interference with a steering post supported transmission control assembly having a laterally projecting handle 294. This arrangement of the brake lever to the left of the steering wheel and the transmission control assembly on the steering post provides additional space at the front elevated floor of the vehicle for piling packages and miscellaneous similar use.

The upper end of steering post 34 is attached rigidly to the instrument board assembly 14 by a brace 295. Above brace 295, a split bracket 296 is secured rigidly to the steering post as by bolts 297. Referring to Figure 13, bracket 296 is formed with a hollow boss 298 which rotatably supports a cylindrical cap 299 having a hollow lateral projection 301. Cap 299 is formed with an axial bore in which slides a block 302. Axial sliding movement of block 302 in either direction within cap 299 is controlled by opposed springs 303 and 304.

At its lower end, block 302 is non-rotatably secured to a selector rod 305 extending parallel to steering post 34. Handle 294 is pivoted at 306 within boss 301 and its inner end is universally connected, as at 307, to block 302 so that rocking motion of the handle about pivot 306 causes axial displacement of rod 305 for a purpose later to be described. A hollow shifter rod 308, concentric with rod 305 but distinct therefrom, is non-rotatably secured to the lower end of cap 299, as by fastening element 309. Manipulation of handle 294 to rotate cap 299 about its axis thereby causes rotation of rod 308 about its axis for a purpose to be described.

At the lower end of the steering post and below floor 25 (Figure 9), a split bracket 311 substantially identical with bracket 296 is secured upon the steering post as by bolts 312. Bracket 311 is formed with an integral hollow boss 313 (Figure 10) in which the lower end of rod 308 is rotatably mounted. Rod 308 extends through and terminates a short distance below boss 313, and (Figure 11) rod 305 extends through the open end of rod 308 and terminates in a threaded portion 314 beyond the lower edge of rod 308.

A block 315 is non-rotatably secured upon the lower end of rod 305 and maintained thereupon by a suitable lock nut assembly 316. A bell crank 317, having one arm pivoted at 318 on block 315, is pivotally carried intermediate its arms by a pin 319 rigid with the lower end of a suspended link 321 pivoted at 322 upon boss 313. The other arm of bell crank 317 has a ball and socket connection 323 with one end of a link 324 which has its downturned other end pivotally mounted on one arm of a swingable lever 325. Lever 325 is pivotally mounted on a generally vertical post 320 carried by an elongated hollow boss 326 integral with transmission housing 300.

Lever 325 is formed with another arm having an elongated slot 327 providing a lost motion connection with a pin 328 rigid with a slidable gear selector rod 330 which extends from the transmission housing below boss 326.

When handle 294 is rocked about pivot 306, the resulting axial displacement of rod 305 is transmitted through bell crank 317 and rod 324 to cause rocking of lever 325 about post 320. Through the lost motion connection at 327 and 328, this rocking movement of lever 325 is transformed into sliding movement of rod 330. This sliding movement of rod 330 effects gear selector movement within the transmission housing and since the mechanism within the transmission housing is conventional further description of the same is unnecessary.

Above boss 313, an arm 331 is formed at one end with a split boss rigidly and non-rotatably secured about rod 308 as by bolts 332. The free end of arm 331 is provided with a non-rotatable ball headed stud 333 universally connected with a socket 334 at the front end of a relay rod 335. At its rear end, rod 335 is provided with a bifurcated connector 336 pivotally embracing the upper end of one arm 337 of a Y-shaped lever 338 rigid with a transverse stub shaft 339 rockably supported at opposite ends in spaced bosses 341 and 342 integral with a bracket 343 secured to the front surface of panel 42 as by bolts 344.

The other arm 345 of lever 338 is pivotally embraced by a bifurcated connector 346 rigid with the front end of a second relay rod 347. The front end of rod 347 is provided with a socket 348 universally connected with a ball headed stud 349 rigid with the upper end of a lever 351 keyed or otherwise non-rotatably secured upon the end of transmission control shaft 329.

When handle 294 is manipulated to rock cap 299 about its axis, rod 308 is rotated about its axis and this movement is transmitted through arm 331, relay rod 335, lever 338, relay rod 347 and lever 351 to cause transmission shaft 329 to be rocked about its axis. This rocking movement of shaft 329 effects gear shifting control of conventional mechanism within the transmission housing.

Referring to Figure 9, lever 351 is formed below shaft 329 with a depending integral angular arm 352 pivotally connected at its free end at 353 to the forward end of a rearwardly and downwardly extending rod 354 which is connected to ratchet dog operating lever 219 in the same manner that rod 206 is connected to that lever as explained above in describing the mechanism of Figure 6. If desired, rod 354 may be connected directly to arm 351, as movement of rod 354 in either direction actuates lever 219.

Rocking gear shifting motion of the transmission shaft is thereby employed to control lever 219 and, as in the case of the embodiment illustrated in Figure 1, when handle 294 is in neutral position, ratchet teeth 233 are capable of being engaged with teeth 162 for locking the service brake mechanism, but when handle 294 has been manipulated to shift the transmission gears into any driving speed, dog 232 is maintained out of engagement with the ratchet teeth, thereby unlocking the service brake locking mechanism. Operation of the ratchet in controlling the service brake mechanism is the same as above described in connection with Figures 1 and 6.

Of special benefit in the above-described construction is the relay mechanism consisting of rods 335 and 347 and lever 338. During operation of the motor, transmission housing 300, which is rigid with the engine which in turn is resiliently supported on the vehicle frame, is subjected to considerable vibration due to torsional forces effective about an axis parallel to the drive shaft. This vibration becomes transmitted to handle 294 if arm 331 is connected directly to lever 351. Arm 331, rods 335 and 347 and levers 338 and 351 are all movable substantially normal to the direction of the forces setting up this vibration. Hence, provision of the above-described relay mechanism eliminates transmission of motor vibration from the transmission housing to the handle 294.

Figures 14 and 15 illustrate a further embodiment of the above-described transmission control linkage where arm 331 on the lower end of shifter rod 308 is connected substantially directly to transmission control shaft 329 and the relay mechanism above-described is omitted.

Arm 331 is connected by a ball and socket assembly indicated at 355 to one end of a rod 356, and the other end of rod 356 is formed with a socket 357 fitting over a ball headed stud 358 rigid with the upper end of a lever 359 suitably non-rotatably secured upon the outer end of shaft 329.

Below shaft 329, lever 359 is formed with an aligned integral extension 361 which is pivotally connected to the forward end of ratchet control rod 354.

When hollow shifter rod 308 is rocked about its axis by manipulation of handle 294, this motion is transmitted through arm 331, rod 356 and lever 359 to rock transmission lever 329 in its gear shifting function, and to control ratchet dog operating lever 219.

The vehicle of my invention above-described has been designed to provide efficient multiple-stop delivery service at low cost and with a view toward easy control and operation and increased cargo space. The low through aisle floor makes it easy to enter and leave the vehicle with a single step down to the curb, and the provision of a driver's compartment forwardly of the through aisle keeps the aisle clear at all times so that there is no danger of tripping over the clutch and brake pedal or bumping into the steering wheel while passing along the aisle. The forwardly disposed position of the driver gives him better road vision while driving and it will be noted that the service hand brake lever and other hand operated controls are adjacent the periphery of the steering wheel so that all of the vehicle controls are conveniently accessible and may be manipulated with very little effort while the driver maintains one hand on the steering wheel.

The novel combination clutch and brake control reduces the pressure required to operate the foot pedal since the clutch springs no longer oppose movement of the pedal after disengagement of the clutch faces.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within

What is claimed and desired to be secured by United States Letters Patent is:

1. In a vehicle having a chassis supporting clutch, transmission and brake mechanism; a hand lever and a foot pedal independently pivotally mounted on said chassis, flexible means connecting said pedal to said clutch mechanism, means operatively connecting said pedal to said brake mechanism, said connecting means being so constructed and arranged that movement of said pedal in a single direction effects sequential operation of said clutch and brake mechanisms, means operatively connecting said manual lever to said brake mechanism, each of said means connected to said brake mechanism being so constructed and arranged that said pedal and hand lever independently control said brake mechanism, a movable transmission control member, a locking device, means interconnecting said foot pedal and locking device for locking said brake mechanism in brake applied position, and means operatively interconnecting said transmission control member and locking device for releasing the latter upon movement of said member.

2. In a vehicle having a chassis supporting clutch, transmission and brake mechanisms; a pivot assembly mounted on a main longitudinal member of said chassis, a manual lever operatively connected to said brake mechanism rockable on said pivot assembly, a foot pedal connected to sequentially operate said clutch and brake mechanisms rockable on said pivot assembly independently of said lever, a ratchet device supported on a transverse frame member, means connecting said pedal and ratchet device to lock said brake mechanism in brake applied position, a movable gear shift lever, and means interconnecting said ratchet device and shift lever for releasing the former upon movement of the latter.

3. In a vehicle having a chassis and an upright body panel, a bracket rigid with a transverse member of said chassis, a toothed arm swingable on said bracket, a toothed dog rockably mounted on said bracket resiliently urged to engage and lock said arm against movement in a selected direction, a brake mechanism rod connected to control swinging movement of said toothed arm, and a system of levers supported on said panel connected to rock said dog out of engagement with said toothed arm upon manipulation of a drive control lever on said vehicle.

4. Vehicle control mechanism comprising, in combination, a steering post carrying a steering wheel, a transmission control member, a service brake control lever alongside said steering post and having an upper handle portion disposed closely adjacent the periphery of said wheel, a device for locking the service brake mechanism in applied position, a second service brake control lever, means operably connecting one of said service brake control levers to said device, and means operably connecting said transmission control member to said device for releasing said locking device upon movement of said transmission control member.

5. Vehicle control mechanism comprising, in combination, a steering post carrying a steering wheel, a transmission control assembly extending along said post and having a laterally projecting control handle at one side of said post, said handle being closely adjacent said wheel so as to be quickly and conveniently accessible to the driver's hand, a service brake control lever alongside said post and having an upper handle portion closely adjacent the periphery of said wheel at the side opposite said transmission control handle, a device for locking the service brake mechanism in applied position, a second service brake control lever, means operably connecting one of said service brake control levers to said device, and means operably connecting said transmission control assembly to said device for releasing said locking device upon movement of said transmission control handle.

6. In a vehicle, a vehicle transmission control, manually operable brake mechanism, means comprising a pair of cooperating locking members for locking said mechanism in brake applied position, a common support bracket for said members rigid with the frame of said vehicle, and means operable upon manipulation of the vehicle transmission control for releasing said locking means.

7. In a vehicle, manually operable brake mechanism, a bracket, a toothed arm pivoted on said bracket and connected to be moved by said brake mechanism, a toothed element pivoted on said bracket adapted to cooperatively engage said arm, a spring opposing pivotal movement of said element in one direction, a lever pivoted on said bracket, means on said lever operable to rotate said element against opposition of said spring upon movement of said lever in either direction about its pivot, and mechanism yieldably interconnecting said lever with another vehicle control.

8. In a vehicle having brake mechanism and manual gear shift means, a bracket, a pair of brake mechanism locking ratchet members pivoted on said bracket, a lever pivoted at one end on said bracket and operatively connected intermediate its ends to one of said members, and means operatively interconnecting said gear shift means and said lever.

9. In a vehicle, a rockable transmission control element, manually operable brake mechanism distinct from said element, means comprising relatively movable tooth and ratchet members for locking said brake mechanism in applied position, a common support bracket for said locking members, a lateral chassis member upon which said bracket is rigidly mounted, and means operable upon manipulation of said control element for releasing said locking means.

10. Vehicle control mechanism comprising a steering post, a transmission gear control rod movably mounted on said post, an operating handle for said rod, a movable transmission control shaft, means interconnecting the lower end of said control rod and said shaft so that manipulation of said handle effects movement of said shaft, service brake mechanism for said vehicle, means locking said service brake mechanism in applied position, and means operated by movement of said handle and said rod for effecting release of said locking means.

11. Vehicle control mechanism comprising a steering post, a transmission gear shifter rod rockably mounted on said post, an operating handle for said rod, a rockable transmission control shaft, means interconnecting the lower end of said rod and said control shaft whereby manipulation of said handle to rock said rod causes rocking gear shift motion of said shaft, service brake mechanism for said vehicle, a locking device for said service brake mechanism, and means operated by rocking movement of said shifter rod for releasing said locking device.

12. In a vehicle having a chassis, a vehicle transmission control, manually operable brake mechanism, a bracket rigid with said chassis, means for locking said brake mechanism in applied position comprising a pair of cooperating ratchet members pivoted on said bracket, and means operable upon manipulation of the vehicle transmission control for releasing said locking means.

13. In a vehicle brake control mechanism, a brake mechanism locking element mounted to rotate about a fixed pivot, a spring urging rotation of said element in one direction, a bifurcated member mounted for rotation with said element, a rock lever pivoted at one end and having an intermediate portion between the arms of said bifurcated member, said intermediate portion being shaped so that rocking of said lever in either direction about its pivot causes rotation of said element in opposition to said spring, and means yieldably connecting said rock lever to another vehicle control.

14. In a vehicle brake control mechanism, a rigid hollow boss, a shaft rotatably supported within said boss, a spring urging rotation of said shaft in one direction, a brake mechanism locking element rigid with one end of said shaft, a bifurcated member rigid with the other end of said shaft, a rock lever mounted on a fixed pivot at one end and having an intermediate portion disposed between the arms of said bifurcated member, said intermediate portion being so constructed and arranged that rocking of said lever in either direction about its pivot causes rotation of said shaft in opposition to said spring, and means yieldably connecting the free end of said rock lever to another vehicle control.

15. In a vehicle, a brake control mechanism, a swingable toothed arm connected to be moved by said brake mechanism, a pivoted toothed element adapted to engage said toothed arm, a spring urging pivotal movement of said element toward engagement with said toothed arm, a rock lever pivoted at one end and connected intermediate its ends to said toothed element so as to rotate said element against opposition of said spring upon movement of said lever in either direction about its pivot, and mechanism yieldably connecting said rock lever with another vehicle control.

16. In a vehicle having brake mechanism and manual gear shift means, a pair of pivoted cooperating brake mechanism locking ratchet members, a rock lever pivoted at one end and operatively connected intermediate its ends to one of said members, and means yieldably interconnecting said gear shift means to said lever.

17. In the vehicle defined in claim 16, said means comprising a rod slidably connected with the free end of said lever and a spring between said lever and the rod.

18. Vehicle control mechanism comprising a steering post, a gear shift lever rockably mounted on said post, a rockable transmission control member operably connected to be actuated by manipulation of said lever, a shiftable brake mechanism locking element, a rod pivotally connected to said member and yieldably connected to said locking element, and a second shiftable brake mechanism locking element adapted to cooperate with said first named brake mechanism locking element connected to be moved by said brake mechanism.

19. In a vehicle having brake mechanism, a brake mechanism locking element, a pivoted rock lever connected to actuate said brake locking element, a movable transmission control member, a rod connected at one end to said member and having a slidable connection with said rock lever, and yieldable means between opposite sides of said rock lever and said rod so that the rock lever has a yieldable connection with said rod when moved in either direction about its pivot by said rod.

JOHN NICOL.